United States Patent
Simon et al.

(10) Patent No.: US 9,604,869 B2
(45) Date of Patent: *Mar. 28, 2017

(54) BUSHINGS COMPRISING NOTCHED TERMINAL EARS

(71) Applicant: 3B-Fibreglass sprl, Battice (BE)

(72) Inventors: Philippe Simon, Battice (BE); Dimitri Laurent, Battice (BE)

(73) Assignee: 3B-Fibreglass sprl, Battice (BE)

( * ) Notice: Subject to any disclaimer, the term of this patent is extended or adjusted under 35 U.S.C. 154(b) by 60 days.

This patent is subject to a terminal disclaimer.

(21) Appl. No.: 14/374,186

(22) PCT Filed: Jan. 14, 2013

(86) PCT No.: PCT/EP2013/050550
§ 371 (c)(1),
(2) Date: Jul. 23, 2014

(87) PCT Pub. No.: WO2013/110517
PCT Pub. Date: Aug. 1, 2013

(65) Prior Publication Data
US 2015/0033800 A1    Feb. 5, 2015

(30) Foreign Application Priority Data
Jan. 24, 2012 (EP) .................................. 12152302

(51) Int. Cl.
*C03B 37/083* (2006.01)
*C03B 37/09* (2006.01)
*C03B 37/08* (2006.01)

(52) U.S. Cl.
CPC ............ *C03B 37/083* (2013.01); *C03B 37/08* (2013.01); *C03B 37/091* (2013.01)

(58) Field of Classification Search
CPC ......................................... C03B 37/08–37/095
See application file for complete search history.

(56) References Cited

U.S. PATENT DOCUMENTS

| 4,634,460 A | 1/1987 | Fowler | |
|---|---|---|---|
| 2003/0167802 A1* | 9/2003 | Hanna | C03B 37/091 65/499 |
| 2008/0141726 A1* | 6/2008 | Purvis | C03B 37/095 65/475 |

FOREIGN PATENT DOCUMENTS

| EP | 0229648 A1 | 7/1987 |
|---|---|---|
| JP | 62191438 A | 8/1987 |
| KR | 20020086925 A | 11/2002 |

* cited by examiner

*Primary Examiner* — Lisa Herring
(74) *Attorney, Agent, or Firm* — Avery N. Goldstein; Blue Filament Law PLLC

(57) ABSTRACT

A bushing assembly is provided including terminal ears coupled to opposed end walls of the bushing assembly. Each of the terminal ears includes an electrically conductive plate with a first terminal edge (1D) coupled to a bushing first end wall, and extending away from the first end wall to a second, free terminal edge (1A) and having a curved geometry. The curvature, $1/(2R)$, at any point of the curved second end of the slot is less than the reciprocal, $1/W_o$, of the smallest gap width, $W_o$, of both slot first open end, $W_A$, and elongated portion, $W_B$, where R is defined as the radius at any point of the curved second end.

19 Claims, 2 Drawing Sheets

BUSHINGS COMPRISING NOTCHED TERMINAL EARS

TECHNICAL FIELD

The present invention relates to glass fibre manufacturing equipment. In particular it concerns terminal ears used for bringing a bushing assembly to a suitable temperature for the production of glass filaments.

BACKGROUND FOR THE INVENTION

Glass fibres can be produced by melting a glass composition in a melter and drawing them out through the tip plate of a bushing assembly. A bushing assembly is generally in the form of a rectangular box with two pairs of opposed side and end walls forming the perimeter thereof with an opening at the top in fluid communication with the melter. The bottom floor comprises a tip plate which is a plate comprising a multitude of orifices or tips through which the glass melt can flow to form fibres, which are attenuated to reach their desired diameter. To ensure an optimal control of the viscosity, the temperature of the tip plate must be controlled accurately. The temperature of the tip plate depends on the glass melt composition but is generally well above 1200° C. Because of the extreme working conditions, the various components of a bushing assembly are made of platinum or platinum alloys, typically rhodium-platinum alloys.

The bushing is heated electrically by passing current through the body of the bushing from a first connector clamped to a first terminal ear, thermally coupled to a first end wall of the bushing body, to a second connector clamped to a second terminal ear, thermally coupled to a second end wall of the bushing body, opposite the first end wall. To prevent the connectors, usually made of copper, from overheating and from deforming, they are usually water cooled. The terminal ears are therefore exposed to severe thermal gradients, between the free end thereof, where water cooled connectors are clamped and the end coupled to the bushing end wall which is at temperatures of well above 1200° C. Such extreme temperature gradients have two drawbacks; first they create substantial strain in the terminal ears which are fixed at both opposite ends of the bushing body because of varying levels of thermal expansion as the temperature varies, leading to warpage of the ears. Second, the cooling of the connectors also cools the end walls of the bushing, when a homogeneous temperature is required at the level of the bushing tip plate. To solve the latter problem, US2003/0167802 proposed to provide at least one V-shaped notch at or near an unattached end of the ear. A similar design is proposed in FIG. 6 of U.S. 6,196,029. The problem is that, even though the cross sectional area of the unattached end of a terminal ear which is being cooled compared with the end coupled to the bushing end wall is smaller than in the case of an un-notched terminal ear, the density of current passing through the electrodes required to heat the bushing is higher and the electrodes therefore require more cooling, so that what is gained on the one hand by reducing the cooled portion of the terminal ear is wasted on the other hand by requiring more cooling to maintain the smaller electrodes at their working temperature. Furthermore, internal stresses tend to concentrate at the tip of the V-notch, leading to the premature failure of the terminal ear, and thus to the interruption of the production.

Terminal ears with I-shaped notches have been proposed in the art, such as in CN2516548U and in US2006/0218972. In the latter document such notches are meant to receive a bolt to fix an electrical connector to a terminal ear. The design of the terminal ear disclosed in CN2516548U is the equivalent of the one disclosed in US2003/0167802 discussed above, having an I-shaped notch instead of a V-shaped notch. The connectors size is larger in an I-shaped notch, but stress concentration at the tip of the notch is still very high.

There remains a problem to allow the optimum design for reducing cooling of the bushing end walls by the connectors cooling systems, and concomitant reduction of stress concentration in the terminal ears, leading to their premature failure. This and other problems are solved by the present invention.

SUMMARY OF THE INVENTION

The present invention is defined in the appended independent claims. Preferred embodiments are defined in the dependent claims. In particular, the present invention concerns a bushing assembly comprising terminal ears coupled to opposed end walls of the bushing assembly, for heating the bushing tip plate and walls, each of said terminal ears comprising an electrically conductive plate comprising a first terminal edge coupled to a bushing first end wall, and extending away from said first end wall to a second, free terminal edge (1A) connectable to a source of power, said plate comprising a slot comprising:

(a) a first, open end of width, $W_A$, at the second, free edge of the plate, (b) an elongated portion extending towards said first edge of gap width, $W_B$, and (c) a second, closed end, separate from the first edge of the terminal ear, and having a curved geometry;

characterized in that, the curvature, $1/(2R)$, at any point of the curved second end of the slot is less than the reciprocal, $1/W_0$, of the smallest gap width, $W_0$, of both slot first open end, $W_A$, and elongated portion, $W_B$, wherein R is the radius at any point of the curved second end.

In the present context, the terms "slot" and "notch" are used as synonyms.

In a preferred embodiment, the slot has a keyhole geometry. For example, the elongated portion of the slot may have a constant width, $W_B$, preferably comprised between 2 and 50 mm, preferably between 5 and 20 mm, more preferably between 8 and 13 mm. Alternatively, the elongated portion may flare out with the open end having a gap width, $W_A$, larger than the elongated portion.

It is advantageous if the second, open end portion of the slot is circular of radius, R, or elliptical of small radius, R, wherein R is preferably comprised between 5 and 60 mm, preferably between 7 and 25 mm, more preferably between 10 and 20 mm.

Each terminal ear may comprise one or more than one such slots. In a preferred design, the terminal ear is folded over a line substantially parallel to both first and second terminal edges. It is preferred that the slot elongated portion extends along a direction substantially normal to both first and second terminal edges.

BRIEF DESCRIPTION OF THE FIGURES

For a fuller understanding of the nature of the present invention, reference is made to the following detailed description taken in conjunction with the accompanying drawings in which.

DETAILED DESCRIPTION OF THE INVENTION

Figure 1:
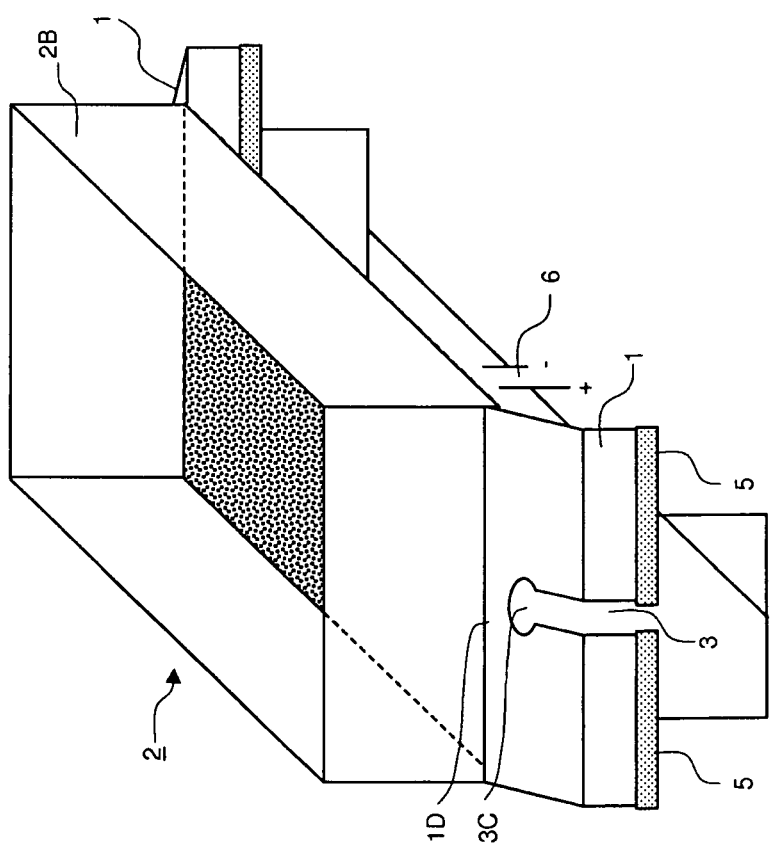
FIG. 1: shows a perspective view of a bushing assembly with terminal ears according to the present invention.
Figure 2:
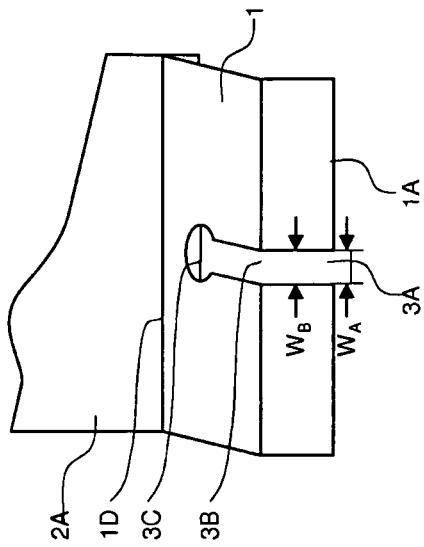
FIG. 2: shows a perspective view of a terminal ear according to the present invention.

As illustrated in FIG. 1, a bushing assembly (2) generally comprises two side walls (2B) and two end walls (2A) forming the peripheral walls of the assembly. The side walls (2B) define the longitudinal dimension of the bushing assembly and the end walls (2A) define the transverse dimension. The top surface of the assembly (not shown) is open to bring it in fluid communication with a source of molten glass, typically a furnace. The floor of the bushing assembly comprises a tip plate which comprises a multitude of orifices allowing the glass melt to flow out and be drawn to form fine glass fibres. In some embodiments (not illustrated in the Figures), the floor may be divided in two tip plate portions by a central beam which contributes to the stiffening of the floor in the longitudinal direction. A number of reinforcing ribs (not shown) are also generally distributed along the length of each tip plate portion, extending in the transverse direction to further stiffen the floor. Bushing assemblies are ususaly electrically heated, by running current from a source of electrical current (6) electrically connected (5) to a first terminal ear (1) coupled (1D) to a first end wall (2A) of the bushing assembly, through the bushing assembly in the longitudinal direction and out through a second terminal ear coupled to the opposite end wall.

The source of electrical current (6) is connected to the terminal ears through connectors (5) coupled to the free edge (1A) of each terminal ear. The connectors (5) are usually made of copper or other good electrical conductor. In view of the high current density passing therethrough, they need be cooled, generally water cooled, in order to maintain their temperature within reasonable working values, e.g., not more than 150-200° C. The temperature at the opposed edge (1D) of each terminal ear, which are coupled to an end wall (2A) of the bushing assembly is of the order of 1200-1400° C., thus creating huge thermal gradients along the longitudinal direction of the terminal ears which provoke warping of, and build-up of internal stresses within the terminal ears, due to varying magnitudes of the ear thermal expansion along the thermal gradient. The connectors cooling also drives a substantial heat flow running down said gradient which cools the end walls (2A) the terminal ears are coupled to.

As suggested in US2003/0167802, the heat flow cooling the end walls (2A) of the bushing assembly can be somewhat limited by reducing the cross-sectional area of the terminal ears in the longitudinal direction away from the bushing end walls (2A). Care should be taken not to thus generate a steeper heat gradient by requiring more cooling to maintain the connectors at their working temperature, due to the higher current density passing through connectors of smaller dimensions. If this problem can be addressed by calculation, it remains that the V-shaped notch proposed in said document generates important concentrations of internal stresses at the tip of the V-notch, which can lead to the rapid failure of the terminal ears. The same applies to the tip of I-notches as disclosed in US2006/0218972 or CN2516548U.

The terminal ears of the present invention combine the advantages, in terms of lowering the cooling of the end walls (2A), of terminal ears provided with a notch without having the inconvenience thereof in terms of build-up of internal stresses. This is achieved by ensuring that the curved tip (3C) of the notch has a radius of curvature larger than the half-width, ½ $W_A$, ½ $W_B$, of the gap at any other point. In terms of curvature, $1/(2R)$, at any point of the curved second end (3C) of the slot, it must be lower than the reciprocal, $1/W_0$, of the smallest gap width, $W_0$, of both slot first open end (3A), $W_A$, and elongated portion (3B), $W_B$, wherein R is the radius at any point of the curved second end (3C). Such geometry permits to distribute the internal stresses generated by the thermal gradient about the low curvature notch end (3C), and also to release internal stresses by allowing the two flaps of the ear flanking the notch to warp in different directions independently from one another.

Figure 3:
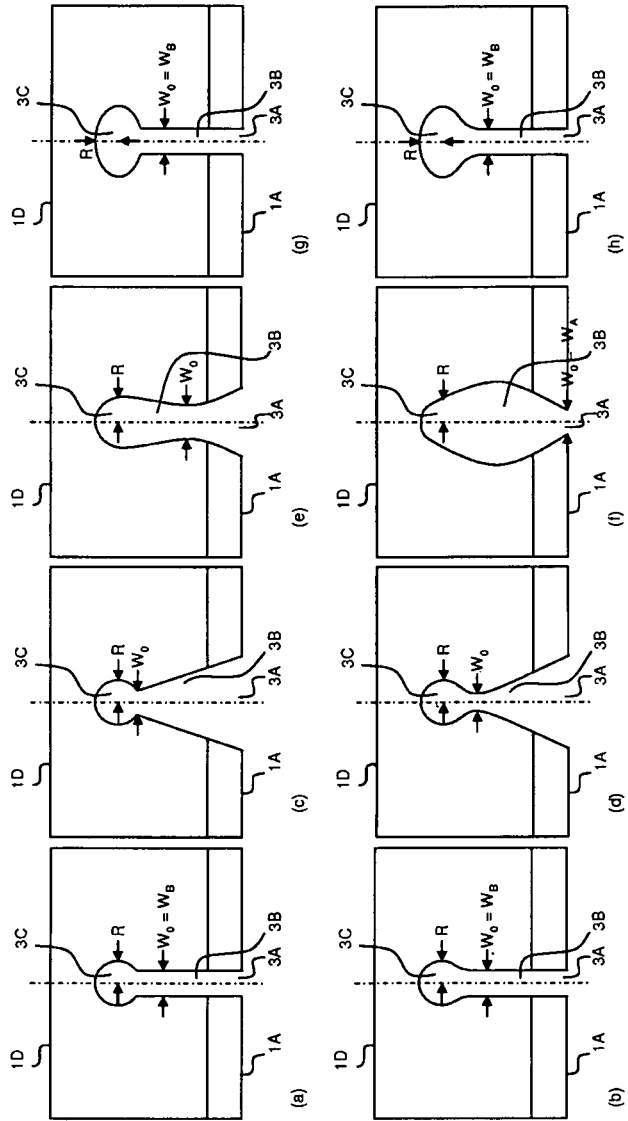
FIG. 3: shows top views of various embodiments of terminal ears according to the present invention.
Figure 4:
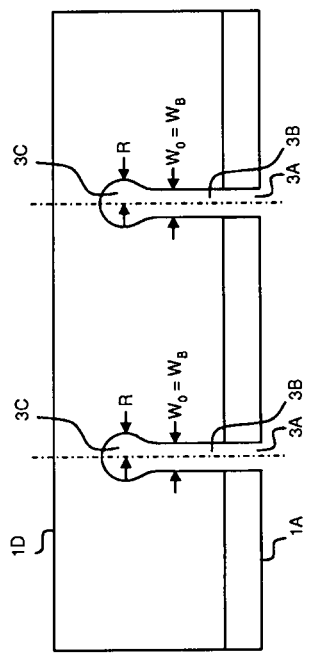
FIG. 4: shows a top view of a terminal ear according to the present invention comprising two notches.

As illustrated in FIG. 4, a terminal ear can be provided with more than one such notch. It may comprise two, three or more such notches arranged side by side. FIG. 3 illustrates schematically various embodiments of notch geometries according to the present invention. For example, the notch can have a keyhole geometry as illustrated in FIG. 3(a)-(d) with a curved second end (3C) having a substantially circular geometry, and an elongated portion (3B) extending till the open end (3A) either with parallel notch walls like in FIG. 3(a)&(b), or flaring out like in FIGS. 3(c)&(d). It is preferred that the notch comprises no sharp corner (i.e., no discontinuity in the tangents at each point of the notch edges), like in FIG. 3(b)&(d) wherein the corners have been rounded up. FIG. 3(e) shows a keyhole-like geometry wherein the corners have been smoothened substantially. The second, closed end (3X) needs not necessarily be circular, and can have any curved shape. For example, as illustrated in FIG. 3(g)&(h), the closed end (3C) of the notch may have a substantially elliptical shape. The geometry illustrated in FIG. 3(f) is illustrative of how the length of the connectors may be increased to lower the current density passing therethrough, whilst still decreasing internal stress concentration build-up with a low curvature closed end (3B).

The slot preferably extends along the longitudinal direction of the terminal ear, wherein the longitudinal direction is defined by the side walls (2B) of the bushing body. The terminal ears of the present invention are preferably in the shape of a rectangular plate, with one or several slots of geometry as discussed above, extending normal from the second, free end of the ear. In a preferred embodiment, the terminal ears are folded over a line substantially parallel to the first, coupled edge (1D) and second, free edge (1A) of the ear. This geometry increases the bending stiffness of the terminal ear in the transverse direction, which is substantially reduced by the presence of the notch.

A terminal ear according to the present invention must be made of a material which is a good electrical conductor and withstands high temperatures of the order of 1400° C. Precious metals are preferably used for making such terminal ears, such as platinum, rhodium, and alloys thereof.

The present invention has the advantage of decreasing the build up of internal stresses within a terminal ear exposed to steep thermal gradients, whilst giving more freedom of design for attenuating the cooling of the end walls (2A) than henceforth permitted.

The invention claimed is:

1. A bushing assembly (2) comprising terminal ears coupled to opposed end walls (2A) of the bushing assembly, for heating a bushing tip plate and walls, each of said terminal ears comprising an electrically conductive plate (1) comprising a first terminal edge (1D) coupled to a bushing first end wall (2A), and extending away from said bushing first end wall to a second, free terminal edge (1A) connectable to a source of power (5, 6), said electrically conductive plate comprising a slot (3) comprising:

(a) a first, open end (3A) of width, $W_A$, at the second, free terminal edge (1A) of said electrically conductive plate,
(b) an elongated portion (3B) extending towards said first terminal edge (1D) of gap width, $W_B$, and
(c) a second, closed end (3C) that has a curvature, separate from said first terminal edge (1D) of one of said terminal ears, and having a curved geometry;
characterized in that, the curvature, $1/(2R)$, at any point of the second, closed end (3C) of the slot is less than the reciprocal, $1/W_o$, of a smallest gap width, $W_o$, of both slot first open end (3A), $W_A$, and elongated portion (3B), $W_B$, wherein R is the radius at any point of the curved second, closed end (3C).

2. The bushing assembly according to claim 1, wherein the elongated portion (3B) of the slot has a constant width, $W_B$.

3. The bushing assembly according to claim 2, wherein the second, end (3C) portion of the slot is circular of radius, R, or elliptical of small radius, R, wherein R is between 5 and 60 mm.

4. The bushing assembly according to claim 2, wherein each terminal ear comprises more than one such slots.

5. The bushing assembly according to claim 2, wherein the electrically conductive plate (1) of the terminal ear is folded over a line substantially parallel to said first terminal edge (1D) and second, free terminal edge (1 A) of the terminal ear.

6. The bushing assembly according to claim 2, wherein the elongated portion (3B) of the slot extends along a direction substantially normal to both first terminal edge (1D) and second, free terminal edge (1A).

7. The bushing assembly according to claim 1, wherein the first, open end (3A) has a gap width, $W_A$, larger than the gap width, $W_B$, at any point of the elongated portion (3B).

8. The bushing assembly according to claim 1, wherein the second, closed end (3C) portion of the slot is circular of radius, R, or elliptical of small radius, R.

9. The bushing assembly according to claim 1, wherein each terminal ear comprises more than one such slots.

10. The bushing assembly according to claim 1, wherein the electrically conductive plate (1) of the terminal ear is folded over a line substantially parallel to said first terminal edge (1D) and second, free terminal edge (1 A) of the terminal ear.

11. The bushing assembly according to claim 1, wherein the elongated portion (3B) of the slot extends along a direction substantially normal to both first terminal edge (1D) and second, free terminal edge (1A).

12. A bushing assembly (2) comprising terminal ears coupled to opposed end walls (2A) of the bushing assembly, for heating a bushing tip plate and walls, each of said terminal ears comprising an electrically conductive plate (1) comprising a first terminal edge (1D) coupled to a bushing first end wall (2A), and extending away from said bushing first end wall to a second, free terminal edge (1A) connectable to a source of power (5, 6), said electrically conductive plate comprising a slot (3) comprising:

(a) a first, open end (3A) of width, $W_A$, at the second, free terminal edge (1A) of said electrically conductive plate,
(b) an elongated portion (3B) extending towards said first terminal edge (1D) of gap width, $W_B$, and
(c) a second, closed end (3C) that has a curvature, separate from said first terminal edge (1D) of one of said terminal ears, and having a curved geometry;
characterized in that, the curvature, $1/(2R)$, at any point of the second, closed end (3C) of the slot is less than the reciprocal, $1/W_o$, of a smallest gap width, $W_o$, of both slot first open end (3A), $W_A$, and elongated portion (3B), $W_B$, wherein R is the radius at any point of the curved second end (3C), and wherein the slot has a keyhole geometry.

13. The bushing assembly according to claim 12, wherein the elongated portion (3B) of the slot has a constant width, We, of between 2 and 50 mm.

14. The bushing assembly according to claim 12, wherein the elongated portion (3B) of the slot has a constant width, We, of between 5 and 20 mm.

15. The bushing assembly according to claim 12, wherein the first, open end (3A) has a gap width, $W_A$, larger than the gap width, $W_B$, at any point of the elongated portion (3B).

16. The bushing assembly according to claim 12, wherein the second, end portion (3C) of the slot is circular of radius, R, or elliptical of small radius, R, wherein R is between 5 and 60 mm.

17. The bushing assembly according to claim 12, wherein each terminal ear comprises more than one such slots.

18. The bushing assembly according to claim 12, wherein the electrically conductive plate (1) of the terminal ear is folded over a line substantially parallel to said first terminal edge (1D) and second, free terminal edge (1 A) of the terminal ear.

19. The bushing assembly according to claim 12, wherein the elongated portion (3B) of the slot extends along a direction substantially normal to both first terminal edge (1D) and second, free terminal edge (1A).

* * * * *